Patented Aug. 8, 1944

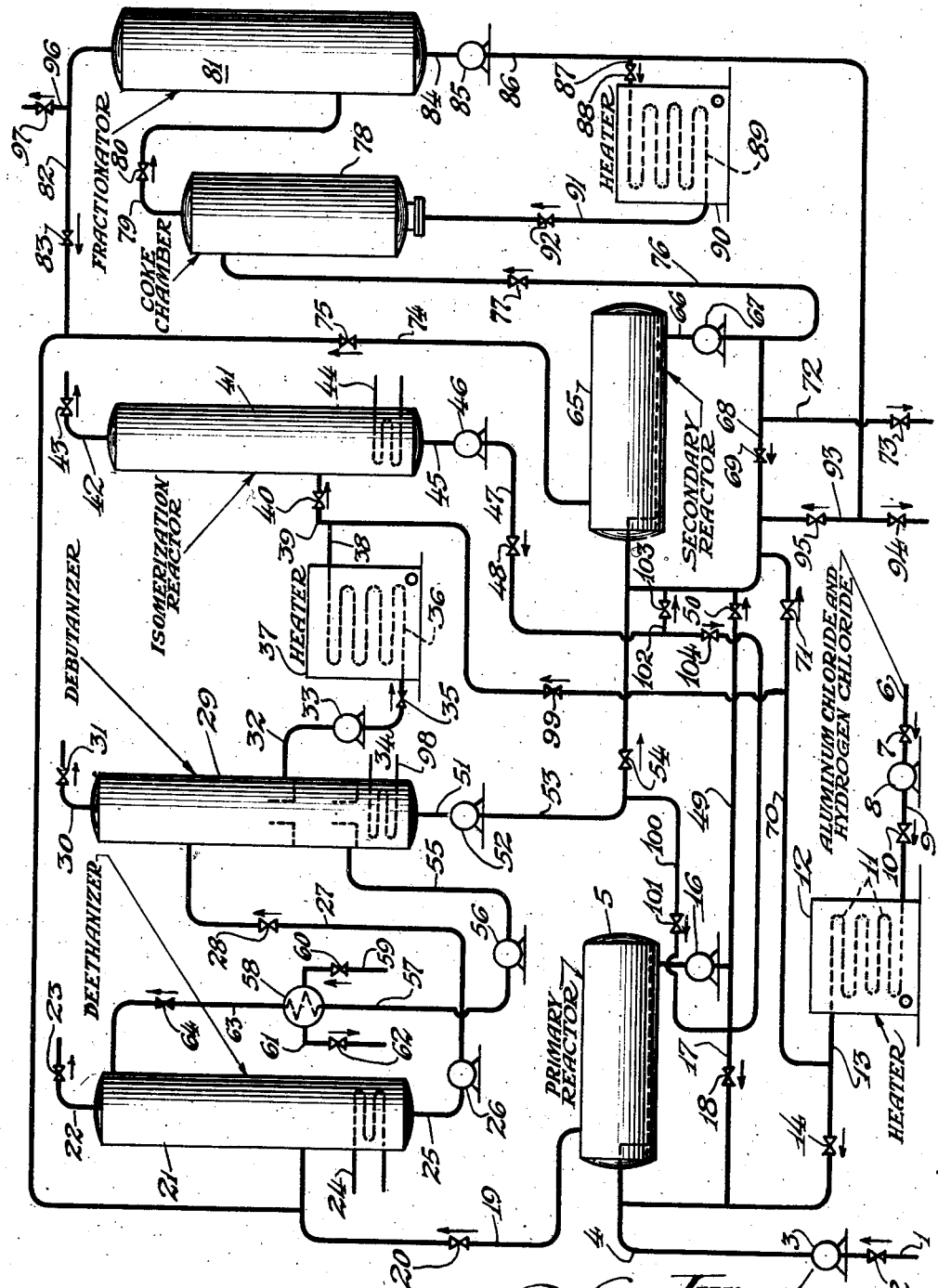

2,355,446

UNITED STATES PATENT OFFICE 2,355,446

ALUMINUM CHLORIDE TREATMENT OF HYDROCARBON OILS

Vasili I. Komarewsky and Lev A. Mekler, Chicago, Ill., assignors to Universal Oil Products Company, Chicago, Ill., a corporation of Delaware Application September 12, 1940, Serial No. 356,458

6 Claims. (Cl. 260—683.5)

This invention relates to the treatment of petroleum distillates heavier than gasoline to produce therefrom substantial yields of iso-butane, motor fuels with high content of isoparaffins and other valuable products.

The process is particularly applicable to the treatment of gas oil distillates produced as intermediates in the distillation of crude oils but may also be applied to treatment of other petroleum fractions. More particularly the process of the invention is concerned with the catalytic conversion of petroleum distillates boiling higher than gasoline by a continuous process to form high yields of isobutane, isopentane and high octane aviation gasoline.

Isobutane has become a material of great importance to the oil industry as the result of processes of comparatively recent development which are effective in converting it to isoparaffins boiling within the range of gasoline which are greatly in demand as fuels for airplane engines. The isobutane may be catalytically dehydrogenated to form iso-butene which may then be polymerized to form branch chain octenes which readily hydrogenate to the corresponding iso-octanes. The isobutane also may be alkylated with olefins using either thermal or catalytic processes to form isoparaffins boiling within the range of aviation gasoline. Since isobutane commonly occurs in smaller yields than the normal compound, any process for augmenting its yield from petroleum is of great importance.

The process of this invention operates in several stages. In the first catalytic stage, the raw oil charging stock is treated with aluminum chloride plus a minor amount of hydrogen chloride under conditions suitable for the formation of normally gaseous products having a high content of isobutane. The second catalytic stage uses as a charging stock the liquid product from the first stage together with a recycle material approximately of the same characteristics. In the second catalytic step liquid from the first step together with recycle material of similar characteristics is treated with aluminum chloride under conditions suitable for the formation of predominantly gasoline boiling range hydrocarbons. These gasoline boiling range hydrocarbons are then subjected to treatment with aluminum chloride and hydrogen chloride in a third step under conditions suitable for the isomerization of the remaining normal paraffins to isoparaffins. The liquid residue from the second catalytic cracking step may be directed to a coke chamber to reduce the residue to coke. The volatile products obtained from the coke chamber are fractionated into various fractions and returned to the system.

In one specific embodiment the present invention comprises a process for the production of isobutane and a high octane motor fuel which comprises continuously charging a raw oil with anhydrous aluminum chloride and hydrogen chloride to an externally heated reactor, establishing recirculation of said mixture and catalyst, said recirculated mixture being discharged against the heated surface of the reactor in the form of high velocity jets, the rate of circulation, time of contact and temperature being regulated to form substantial quantities of isobutane, continuously removing from said reactor a vaporous fraction comprising said isobutane and a liquid fraction containing aluminum chloride in suspension, charging said liquid fraction to a second externally heated reactor for further reacting in the presence of aluminum chloride and hydrogen chloride, establishing recirculation of said liquid fraction and catalyst, said recirculated mixture being discharged against the heated surface of the second reactor in the form of high velocity jets, the rate of recirculation, time of contact and temperature in said second reactor being regulated to form substantial quantities of a high octane substantially saturated motor fuel, continuously removing from said second reactor a vaporous fraction comprising said motor fuel and a liquid fraction containing catalyst in suspension, charging said liquid fraction containing the catalyst in suspension to a coking chamber to effect reduction of the non-volatile constituents thereof to coke, fractionating the volatile products evolved from the coke chamber to separate a fraction comprising gasoline and normally gaseous products and a higher boiling liquid fraction, heating a portion of said higher boiling liquid fraction to effect vaporization thereof, supplying said heated vapors to the aforesaid coking chamber to supply heat to said chamber and to aid in the removal of the volatile constituents of said coking chamber, fractionating the vapors evolved from the two reaction chambers to separate isobutane, gasoline, and a higher boiling liquid residue containing condensed aluminum chloride vapors in suspension, subjecting said gasoline to the action of anhydrous aluminum chloride and hydrogen chloride under conditions suitable for the isomerization of the normal paraffinic constituents thereof to isoparaffins and returning the aforesaid higher boiling liquid residue containing condensed aluminum chloride vapors to the second reactor for further reacting.

The accompanying drawing diagrammatically illustrates one specific form of the apparatus wherein the process of our invention may be conducted, as well as other features hereinafter described.

Referring now to the drawing, charging stock for the process which may comprise a gas oil is supplied to the system through line 1 and after passing through valve 2 is directed by means of pump 3 into line 4 which discharges into reactor 5. Before discharging into the reactor, the charging stock is commingled with anhydrous aluminum chloride and hydrogen chloride and with a recycle fraction obtained in a manner hereinafter set forth. The aluminum chloride and hydrogen chloride are introduced to the system by way of line 6 controlled by valve 7 from which the mixture enters pump 8 discharging into line 9 controlled by valve 10. The aluminum chloride may be supplied in a slurry of hydrocarbon oil, although a preferred method is to use a sufficient pressure and temperature to keep the aluminum chloride in a molten state. Heating coil 11 so disposed as to receive heat from furnace 12 discharges the aluminum chloride, together with hydrogen chloride at a temperature of the order of 400–600° F. The portion of the heated catalyst needed for reactor 5 passes through valve 14 located in line 13 from which it enters line 4 for commingling with the raw oil charging stock and the recycle liquid to form the combined feed for the reactor. Reactor 4 is provided with means for a high degree of recirculation and agitation of the heated materials, said heated materials being discharged against the surface of the reactor in a thin fast-moving film so as to prevent coagulation and deposition of the coke-forming materials on the heated surfaces. Preferably the degree of recirculation is varied from inlet to outlet by either varying the number and size of the jets which produce the turbulence inside the reactor or by changing the depth of the pool of liquid inside the reactor or both to obtain a relatively quiescent zone near the outlet so as to permit the relative concentration of the heavier materials near the outlet and their removal from the reactor by the effluent material. As is shown in the drawing, a liquid fraction is removed from reactor 5 by way of line 15 and after passing through pump 16, a portion is removed by way of line 49 to a second reactor for treatment as hereinafter set forth. The remainder and greater portion of the liquid discharging from pump 16 enters line 17 controlled by valve 18 and is returned to the reactor by being discharged into line 4. The quantity of aluminum chloride supplied to reactor 5 may vary from ½ to 5% by weight of the charging stock. The amount of hydrogen chloride may be approximately ½ volume per cent of the charging stock. The temperature maintained in reactor 5 is of the order of 400–600° F. Reactor 5 is externally heated in order to supply the heat absorbed in the endothermic cracking reactions. The pressure maintained within the reactor lies within the range of atmospheric to about 200 pounds per square inch and is preferably about 100 pounds per square inch. The liquid fraction recirculated by way of line 17 valve 18 may be approximately 25–100 volumes of liquid per volume of raw oil charging stock.

The vaporous fraction evolved from reactor 5 is removed by way of line 19 and after passing through valve 20 is commingled with other vapors formed as hereinafter set forth and as shown in the flow diagram. This mixture of vapors enters column 21 which operates as a de-ethanizer. Light gaseous hydrocarbons, together with hydrogen formed in the process, remain undissolved in the absorption oil used in column 21 and are removed as an overhead product by way of line 22 controlled by valve 23. Absorbing column 21 is equipped with heating coil 24 and the lower boiling hydrocarbons are fractionated from the heavier products in the lower portion of the column. The liquid removed from the bottom of column 21 contains the isobutane and higher boiling products formed in the process. It enters line 25 supplying pump 26 discharging into line 27 controlled by valve 28. After passing through valve 28 this liquid enters debutanizing column 29 wherein an overhead product containing the isobutane formed in the process, together with minor amounts of higher as well as lower boiling constituents, is removed as an overhead product by way of line 30 controlled by valve 31. Debutanizing column 29 operates in the conventional manner, a portion of the overhead product being condensed and returned to the column as a reflux, although means for accomplishing this are not shown in the diagram. To prevent the possible plugging up of coolers and condensers with the aluminum chloride that passes on with the vapors, contact type condensers are preferably used in this process. In these condensers vapors are bubbled through a pool of the condensate, the latter being used as a cooling medium. A portion of the condensate is recirculated through a cooler to abstract the heat equal to that brought into the condenser by the vapors. In the operation of debutanizing column 29, a side cut comprising the gasoline formed in the process is removed by way of line 32 and after passing through pump 33 enters line 34 controlled by valve 35 and enters heating coil 36 so disposed as to receive heat from furnace 37. The temperature of the heated gasoline leaving coil 36 lies within the approximate limits of 150–500° F. It enters line 38 and is directed to line 39 wherein it is commingled with a further supply of anhydrous aluminum chloride and hydrogen chloride and then passes through valve 40 entering column 41 which operates as a reactor for isomerization of normal paraffinic constituents to isoparaffins. The isomerized gasoline is removed as an overhead product by way of line 42 controlled by valve 43. Column 41 is equipped with heating coil 44 in which the heat needed for fractionating the gasoline from the higher boiling products is supplied. These higher boiling products formed in the isomerization reaction, together with suspended aluminum chloride, are removed from column 41 by way of line 45 and after passing through pump 46 are discharged into line 47 controlled by valve 48 and directed to line 17 from which they are returned to primary reactor 5. If desired, these higher boiling products may in part or all be directed from line 47 to line 102 controlled by valve 103 and discharged into line 68, wherein they become part of the recirculated liquid for secondary reactor 65.

The liquid fraction removed from reactor 5, together with the suspended aluminum chloride, is directed from line 17 into line 49 and after passing through valve 50 enters line 53 wherein it is commingled with the higher boiling liquid fraction obtained in debutanizing column 29. As shown in the diagram, the higher boiling fraction obtained in column 29 enters line 51 supplying pump 52 which discharges into line 53 and after passing through valve 54 is discharged into reactor 65. A portion or all of this higher boiling liquid may be directed from line 53 to line 100 controlled by valve 101 and discharged into line 17 from which it is supplied to the primary reactor 5 as shown in the drawing. A side-cut with an initial boiling point of approximately 200° F. is removed from column 29 by way of line 55 from which it enters pump 56, discharging through line 57 into cooler 58 wherein it enters into indirect heat exchange with the liquid cooling medium supplied by way of line 59 through valve 60 and removed by way of line 61 controlled by valve 62. This cooled naphtha fraction enters line 63 and, after passing through valve 64, is supplied to column 21 wherein it is used as an absorption medium. The secondary reactor 65 is operated in the same general manner as primary reactor 5. It is provided with means for a high degree of recirculation and agitation of the heated materials, said heated materials being discharged against the surface of the reactor in a thin, fast-moving film so as to prevent coagulation and deposition of the coke-forming materials on the heated surface. The degree of recirculation is so varied from inlet to outlet by either varying the number and size of the jets which produce the turbulence inside the reactor or by change of the depth of a pool of liquid inside the reactor, or both, to obtain a relatively quiescent zone near the outlet so as to permit the relative concentration of the heavier materials near the outlet and their removal from the reactor by the effluent material. As is shown in the drawing, a liquid fraction is removed from reactor 65 by way of line 66 and, after passing through pump 67, is divided into two portions. A portion of the stream is directed through line 68 and, after passing through valve 69 is returned to line 53 from which it is returned to the reaction zone. The additional supply of aluminum chloride and hydrogen chloride needed for reactor 65 is obtained by diverting a portion of the stream from line 13 to line 70 from which, after passing through valve 71, it is supplied to line 68 and commingled with the recycled stream for reactor 65. In cases where it might be desired to operate without a coking section of the process, a portion of the stream in line 68 containing used catalyst in suspension is removed from the system by way of line 72 controlled by valve 73.

The temperature of the reacting materials in reactor 65 lies within the approximate limits of 400 to 800° F., while the utilizing pressures lie within the approximate limits of 100 to 300 pounds per square inch. The total quantity of aluminum chloride in suspension in the secondary reactor 65 will vary from 2% to 8% by weight of the hydrocarbon oil. The amount of hydrogen chloride used is approximately one-half mol percent of the hydrocarbons. A vaporous fraction is continuously removed from the secondary reactor by way of line 74, controlled by valve 75, and is directed to line 19 for commingling with the vapors removed from the primary reactor, the resulting mixture being subjected to fractionation as hereinbefore set forth.

A portion of the liquid fraction removed from reactor 65 is directed through line 68 to line 76 from which, after passing through valve 77, it is directed to coking chamber 78. Coking chamber 78 operates in the conventional manner, the evolved constituents formed therein being removed by way of line 79, controlled by valve 80, and directed to fractionator 81. In column 81 gasoline and lower boiling products are removed as an overhead fraction by way of line 82 controlled by valve 83. This mixture of gasoline and lower boiling products is directed to line 74, being commingled with the vaporous fraction obtained from the secondary reactor and then combined with the vapors from the primary reactor. The final mixture is directed to column 21 for separation as indicated in the flow diagram. If desired, the overhead fraction from column 81 may be removed from the system by diverting the stream from line 82 to line 96 controlled by valve 97.

The higher boiling liquid fraction separated in fractionator 81 is removed by way of line 84 from which it enters pump 85, discharging into line 86. This higher boiling liquid, either entirely or in part, is directed to line 87, controlled by valve 88, from which it is supplied to heating coil 89 so disposed as to receive heat from furnace 90. The higher boiling liquid is vaporized in coil 89, the heated vapors leaving by way of line 91 and after passing through valve 92 are supplied to coking chamber 78. The function of these heated vapors is to supply heat to the coking chamber to assist in the removal of the volatile constituents formed in the coking operation. The heated vapors leaving coil 89 may be at a temperature of approximately 1000° F. and at a pressure of about 100 pounds per square inch. If desired, a portion of this higher boiling liquid in line 86 may be directed to line 93 and removed from the system by way of valve 94 or, preferably, directed through valve 95 for recycling to the secondary reactor.

The following example illustrates the yields of the principal products obtainable in the normal operation of the process. While the data are characteristic, they are not introduced with the intent of unduly limiting the proper scope of the invention.

The results obtainable in the case of a Trinidad gas oil are used in the illustration. The gas oil has a 30.0 A. P. I. gravity and a boiling point range of 460–470° F. This stock may be charged to the first reactor with 2% by weight of the aluminum chloride and one-half mol hydrogen chloride per hundred mols of oil, said reactor operating under a pressure of 100 pounds per square inch and at a temperature of 450° F. and using a time of contact such that 35% by volume is distilled from the reactor. The unconverted oil which comprises 65% by volume of the charging stock may then be commingled with 1½% by weight of aluminum chloride and one-half mol of hydrogen chloride per hundred mols of oil and then supplied to the second reactor. This second reactor may be operated at a temperature of 650° F. and a pressure of 100 pounds per square inch and with a time of contact such that 46% by volume of the original stock is removed as a vapor. The liquid residue from the second reactor, containing the used aluminum chloride in suspension, may then be discharged into a coking chamber and reduced to coke. A further quantity of volatile material is formed in the coking process which is then fractionated and the fractions returned to the corresponding parts of the process. By operating the isomerization step at a pressure of 500 pounds per square inch and a temperature of 125° C., the total quantity of aviation fuel produced may be 45 volume percent of the charge. Its octane number may be 81 by C. F. R. motor method while the bromine number may be 8. The quantity of iso-butane obtainable under the above conditions of operation may be equal to 20.0 volume percent of the charging stock.

We claim as our invention:

1. A process for the production of iso-butane and a high octane motor fuel which comprises, continuously charging a hydrocarbon oil with anhydrous aluminum chloride and hydrogen chloride to a reactor, establishing recirculation of admixed oil and catalyst, the rate of recirculation, time of contact and temperature being regulated to form substantial quantities of iso-butane, continuously removing from said reactor a vaporous fraction comprising said iso-butane and a liquid fraction containing the catalyst in suspension, charging said liquid containing aluminum chloride in suspension to a second reactor, establishing recirculation of said liquid fraction and catalyst, the rate of recirculation, time of contact and temperature in said second reactor being regulated to form substantial quantities of a high octane motor fuel, continuously removing from said second reactor a vaporous fraction comprising said motor fuel and a liquid fraction containing the used catalyst in suspension, commingling the vapors from the two reaction chambers and separating from them a liquid fraction of the motor fuel boiling range and subjecting the last-named liquid fraction to the action of anhydrous aluminum chloride and hydrogen chloride under conditions suitable for the isomerization of substantial quantities of the normal paraffinic constituents thereof to form iso-paraffins.

2. A process for the production of iso-butane and a high octane motor fuel, continuously charging a hydrocarbon oil with anhydrous aluminum chloride and hydrogen chloride to a reactor, establishing recirculation of admixed oil and catalyst, the rate of recirculation, time of contact and temperature being regulated to form substantial quantities of iso-butene, continuously removing from said reactor a vaporous fraction comprising said iso-butane and a liquid fraction containing catalyst in suspension, charging said liquid fraction containing aluminum chloride in suspension to a second reactor, establishing recirculation of said liquid fraction and catalyst, the rate of recirculation, time of contact and temperature in said second reactor being regulated to form substantial quantities of a high octane motor fuel, continuously removing from said second reactor a vaporous fraction comprising said motor fuel and a liquid fraction containing the used catalyst in suspension, charging said liquid fraction containing the used catalyst in suspension to a coking chamber to effect reduction of the non-volatile constituents thereof to coke, fractionating the volatile products evolved from the coking chamber to separate a fraction comprising gasoline and normally gaseous products and a higher boiling liquid fraction, commingling said fraction comprising gasoline and normally gaseous products with the vapors evolved from the two reactors, fractionating said mixture to separate iso-butane and a liquid fraction of the motor fuel boiling range, subjecting said liquid fraction of the motor fuel boiling range to the action of anhydrous aluminum chloride and hydrogen chloride under conditions suitable for the isomerization of substantial quantities of the normal paraffinic constituents thereof to form iso-paraffins.

3. A process for the production of iso-butane and a high octane motor fuel which comprises, continuously charging hydrocarbon oil with anhydrous aluminum chloride and hydrogen chloride to a reactor, establishing recirculation of admixed oil and catalyst, the rate of recirculation, time of contact and temperature being regulated to form substantial quantities of iso-butane, continuously removing from said reactor a vaporous fraction comprising said iso-butane and a liquid fraction containing catalyst in suspension, charging said liquid fraction containing aluminum chloride in suspension to a second reactor, establishing recirculation of said liquid fraction and catalyst, the rate of recirculation, time of contact and temperature in said second reactor being regulated to form substantial quantities of a high octane motor fuel, continuously removing from said secondary reactor a vaporous fraction comprising said motor fuel and a liquid fraction containing the used catalyst in suspension, commingling the vapors from the two reaction chambers and separating from them a liquid fraction of the motor fuel boiling range and a higher boiling liquid fraction containing condensed aluminum chloride vapors in suspension, charging said higher boiling liquid fraction with suspended aluminum chloride to the second reactor for treatment as hereinbefore set forth and subjecting the aforesaid liquid fraction of the motor fuel boiling range to the action of anhydrous aluminum chloride and hydrogen chloride under conditions suitable for the isomerization of substantial quantities of the normal paraffinic constituents thereof to form iso-paraffins.

4. A process for the production of iso-butane and a high octane motor fuel which comprises, continuously charging hydrocarbon oil with anhydrous aluminum chloride and hydrogen chloride to a reactor, establishing recirculation of admixed oil and catalyst, the rate of recirculation, time of contact and temperature being regulated to form substantial quantities of iso-butane, continously removing from said reactor a vaporous fraction comprising said iso-butane and a liquid fraction containing catalyst in suspension, charging said liquid fraction containing aluminum chloride in suspension to a second reactor, establishing recirculation of said liquid fraction and catalyst, the rate of recirculation, time of contact and temperature in said second reactor being regulated to form substantial quantities of a high octane motor fuel, continuously removing from said second reactor a vaporous fraction comprising said motor fuel and a higher boiling liquid fraction containing the used catalyst in suspension, supplying the last-named fraction to a coking chamber to effect reduction of the non-volatile constituents thereof to coke, fractionating the volatile products evolved from the coking chamber to separate a fraction comprising gasoline and normally gaseous products and a higher boiling liquid fraction, commingling said fraction comprising gasoline and normally gaseous products with the vaporous fraction evolved from the two reactors, fractionating said mixture to separate iso-butane and a liquid fraction of the motor fuel boiling range and a higher boiling liquid fraction containing condensed aluminum chloride vapors in suspension, charging said higher boiling liquid fraction with condensed aluminum chloride vapors to the second reactor for treatment as hereinbefore set forth and subjecting the aforesaid liquid fraction of the motor fuel boiling range to the action of anhydrous aluminum chloride and hydrogen chloride under conditions suitable for the isomerization of substantial quantities of the normal paraffinic constituents thereof to form iso-paraffins.

5. A conversion process which comprises subjecting hydrocarbon oil to the action of aluminum chloride under isobutane-producing conditions, separating vapors and liquid, subjecting the liquid to the further action of aluminum chloride under gasoline-forming conditions, commingling vaporous products of the last-mentioned step with said vapors, fractionating the resultant mixture to separate therefrom a fraction containing isobutane and a condensate containing gasoline fractions, and subjecting said condensate to isomerization in the presence of additional aluminum chloride.

6. A conversion process which comprises subjecting hydrocarbon oil to the action of aluminum chloride under isobutane-producing conditions, separating vapors and liquid, subjecting the liquid to the further action of aluminum chloride under gasoline-forming conditions, commingling vaporous products of the last-mentioned step with said vapors, fractionating the resultant mixture to separate therefrom a fraction containing isobutane and a condensate containing gasoline fractions, and subjecting said condensate to isomerization in the presence of additional aluminum chloride, removing residual liquid from the second-mentioned aluminum chloride treatment and reducing the same to coke, and commingling resultant vapors with the first-mentioned vapors and said vaporous products for fractionation therewith.

VASILI I. KOMAREWSKY.
LEV A. MEKLER.